United States Patent Office 3,060,172
Patented Oct. 23, 1962

3,060,172
PROCESS FOR RECOVERING SCLAREOL
FROM CLARY SAGE
Claude E. Teague, Jr., and Thomas C. James, Winston-Salem, and Charles D. Mays, Lewisville, N.C., assignors to R. J. Reynolds Tobacco Company, Winston-Salem, N.C., a corporation of New Jersey
No Drawing. Filed Apr. 29, 1959, Ser. No. 809,588
5 Claims. (Cl. 260—236.6)

This invention relates to the recovery of sclareol and has for an object the provision of a process for separating sclareol from clary sage.

It is known that clary sage, *Salvia sclarea*, contains in its stems, leaves and flowering parts substantial amounts of the compound sclareol. As pointed out in copending applications Serial Nos. 708,986 and 708,987, both filed June 15, 1958, now United States patents Nos. 2,905,575 and 2,905,576, respectively, sclareol is useful as a starting material from which may be prepared certain tobacco additives. Accordingly, a further object of this invention is the provision of a process for extracting sclareol from clary sage.

An additional object of this invention is the provision of a process of extracting sclareol from a material known as clary sage "concrete" which itself is a crude extract of clary sage, or from clary sage "absolute" which is a partially purified (dewaxed) extract.

A further object of this invention is the provision of a process for extracting sclareol from clary sage which may be carried out economically and in readily available equipment.

A still further object of this invention is the provision of a process for preparing sclareol having a purity sufficient to enable it to be used in the preparation of the tobacco additives as set forth in the above referred to copending patent applications.

Further and additional objects will appear from the following description and the accompanying claims.

In accordance with one embodiment of this invention, clary sage plant material, in either the dry or green stage, is extracted with a liquid aliphatic hydrocarbon under conditions such that substantially all of the sclareol is extracted from the plant material. In this extraction step it has been found that other substances are extracted with the sclareol by the hydrocarbon solvent and these substances constitute impurities which are undesired when the sclareol is to be used as a material for preparing tobacco additives. An extract prepared essentially as indicated and when concentrated is known to the industry as clary sage concrete. In accordance with this invention, the extract containing the sclareol, the impurities and preferably a portion of the hydrocarbon solvent, is in turn extracted with an aqueous solution of a lower aliphatic alcohol, such as methyl or ethyl alcohol, under conditions whereby the sclareol is dissolved in the alcohol phase and a substantial percentage of the undesired impurities is retained in the hydrocarbon phase. Thereafter the alcoholic extract is concentrated and dried to produce a crystalline product which consists essentially of sclareol.

For a more complete understanding of this invention, reference will now be made to a specific example: Two thousand pounds of the flowering parts of clary sage are extracted with 800 gallons of commercial grade hexane for a period of 2 hours at room temperature. The extracted plant material is then washed countercurrently with an additional 800 gallons of hexane and then discarded. The hexane solutions are combined and distilled until the concentration of extracted material in the solution is approximately 0.5 pound per gallon. The residue, consisting of the hexane and about 20 pounds of extracted plant material, is then contacted with 40 gallons of 87% aqueous methanol in a countercurrent extractor known as a Podbielniak Supercontactor. Methanol containing from 10% (90% aqueous methanol) to 20% (80% aqueous methanol) water can be used in the extraction although 87% aqueous methanol is the preferred solvent. The supercontactor used had an efficiency of 7–8 plates. The methanol layer is then concentrated at reduced pressure to remove the solvent. The thick syrup which remains is oven dried in air at about 50° C. The dry crude crystalline product weighs 13–14 pounds and is 87–92% sclareol.

In the foregoing example hexane has been designated as the aliphatic hydrocarbon solvent in the first extraction step. This is a cut from a still and is commercially designated as hexane. It includes as its main constituents aliphatic hydrocarbons having from 5 to 8 carbon atoms. However, it will readily be appreciated that other liquid aliphatic hydrocarbon solvents or mixtures thereof which have somewhat higher or lower boiling points corresponding to pure aliphatic hydrocarbons having between about 5 and 8 carbon atoms may be used. The hydrocarbons should be aliphatic in nature and preferably should not contain more than ½ or 1 percent of aromatics. The aqueous alcohol employed in the second step is either methanol or ethanol and in order to obtain optimum yields of sclareol the water concentration in the alcohol solvent is preferably between 10 and 20 percent by volume, suitably 13 percent by volume, as indicated in the foregoing example. Also after the first step the hydrocarbon solution containing the sclareol and impurities may or may not be concentrated to form a clary sage concrete but if so, and for ease of operation, it is preferred that the concrete be redissolved in a small amount of an aliphatic $C_5$ to $C_8$ hydrocarbon and then treated with the aqueous alcohol as indicated. The hydrocarbon and aqueous alcohol are, of course, immiscible and the sclareol initially dissolved in the hydrocarbon is extracted therefrom by the aqueous alcohol. The hydrocarbon and alcohol layers are separated by conventional techniques, such as stratification or centrifuging.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

We claim:

1. In a process for separating a sclareol-rich fraction from a liquid saturated aliphatic hydrocarbon extract of clary sage, the improvement which comprises contacting a liquid saturated aliphatic $C_5$–$C_8$ hydrocarbon solution of said extract with an aqueous alcoholic solution comprising from about 10 to about 20 percent by volume of water dissolved in a lower aliphatic alcohol selected from the group consisting of methyl and ethyl alcohols, said alcoholic solution being essentially immiscible with said hydrocarbon solution, whereby the sclareol is preferentially dissolved into the alcoholic solution and thereby separated from impurities which remain in the hydrocarbon solution; separating said immiscible solutions; and concentrating the sclareol in the alcoholic solution by evaporation.

2. In a process for separating a sclareol-rich fraction from a liquid saturated aliphatic hydrocarbon extract of clary sage, the improvement which comprises contacting a liquid saturated aliphatic $C_5$–$C_8$ hydrocarbon solution of said extract with an aqueous alcoholic solution comprising from about 10 to about 20 percent by volume of water dissolved in an alcohol selected from the group consisting of methyl and ethyl alcohols, said alcoholic solution being essentially immiscible with said hydrocarbon solution, whereby the sclareol is preferentially dissolved in the alcoholic solution and thereby separated from impurities which remain into the hydrocarbon solution; separating said immiscible solutions; and concentrating the sclareol in the alcoholic solution by evaporation.

3. The process recited in claim 2 wherein said alcohol is methyl alcohol.

4. The process recited in claim 2 wherein said hydrocarbon is hexane and said alcoholic solution contains about 13 percent by volume of water.

5. A process for separating a sclareol-rich fraction from clary sage which comprises contacting clary sage plant material with a liquid aliphatic hydrocarbon having from 5 to 8 carbon atoms whereby sclareol and certain impurities are dissolved therein; separating the resulting hydrocarbon solution from the residual plant material; intimately contacting said hydrocarbon solution with an aqueous alcoholic solution comprising from about 10 to about 20 percent by volume of water dissolved in a lower aliphatic alcohol selected from the group consisting of methyl and ethyl alcohols, said alcoholic solution being essentially immiscible with said hydrocarbon solution, whereby the sclareol is preferentially dissolved into the alcoholic solution and thereby separated from impurities which remain in the hydrocarbon solution; separating said immiscible solutions; and concentrating the sclareol in the alcoholic solution by evaporation to form said sclareol-rich fraction.

References Cited in the file of this patent

UNITED STATES PATENTS 2,154,713     Van Wijk et al. _____ Apr. 18, 1939

OTHER REFERENCES

Jermstad: Chem. Abstracts, vol 21, page 2960 (1927) [abstracting Parfumerie Moderne, vol. 19, page 151 (1927)].

Jermstad: Chem. Abstracts, vol. 22, page 1824 (1928) [abstracting Pharm. Acta Helv., vol. 2, pages 182–90, 191–6 (1927)].

Janot: Chem. Abstracts, vol. 26, page 2452 (1932) [abstracting Ann. Chem., vol. 17, pages 5–127 (1932)].

Guenther: Essential Oils, vol. 1, pages 218–226 (1948), D. Van Nostrand Co. Inc., New York.

Guenther: Essential Oils, vol. III, pages 734–5 (1949), D. Van Nostrand Co. Inc., New York.